A. B. CLARK.
METHOD OF AND MEANS FOR EQUALIZING THE POTENTIALS OF GROUNDING POINTS.
APPLICATION FILED OCT. 29, 1913.

1,126,956.

Patented Feb. 2, 1915

UNITED STATES PATENT OFFICE.

ALVA B. CLARK, OF BROOKLYN, NEW YORK, ASSIGNOR TO AMERICAN TELEPHONE AND TELEGRAPH COMPANY, A CORPORATION OF NEW YORK.

METHOD OF AND MEANS FOR EQUALIZING THE POTENTIALS OF GROUNDING-POINTS.

1,126,956.  Specification of Letters Patent.  Patented Feb. 2, 1915.

Application filed October 29, 1913. Serial No. 798,087.

*To all whom it may concern:*

Be it known that I, ALVA B. CLARK, residing at Brooklyn, in the county of Kings and State of New York, have invented certain Improvements in Methods of and Means for Equalizing the Potentials of Grounding-Points, of which the following is a specification.

In grounded signaling circuits, as in certain classes of telegraph circuits, the varying differences of ground potential between separated stations may be of such magnitude as to seriously interfere with the operation of the system through their action in irregularly decreasing or increasing the operating currents.

The object of this invention is to equalize the potentials at the grounding points, this being effected by applying to the ground connection at one station a potential which will tend to neutralize the ground potential differences.

Figure 1:
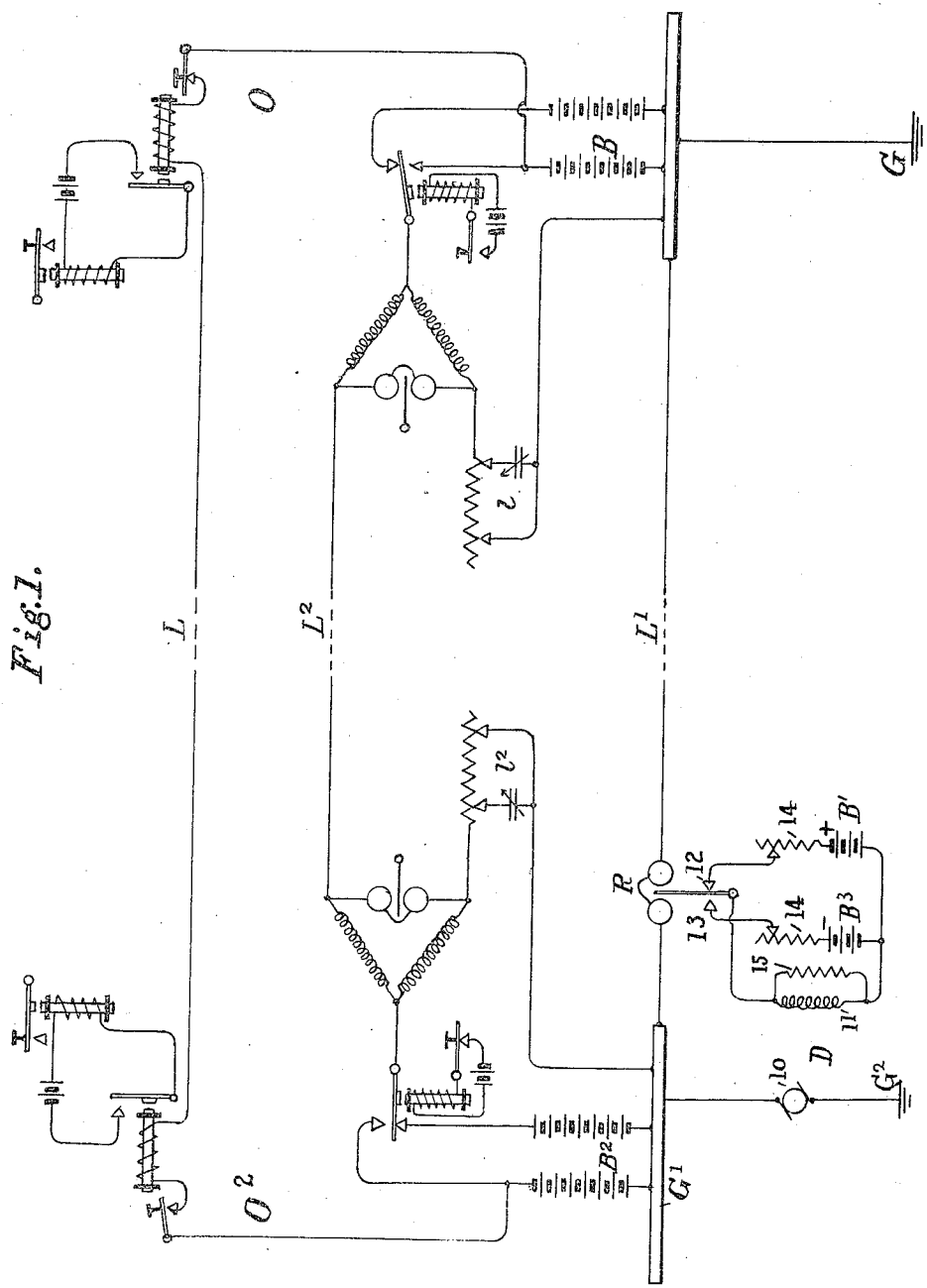
Figure 2:
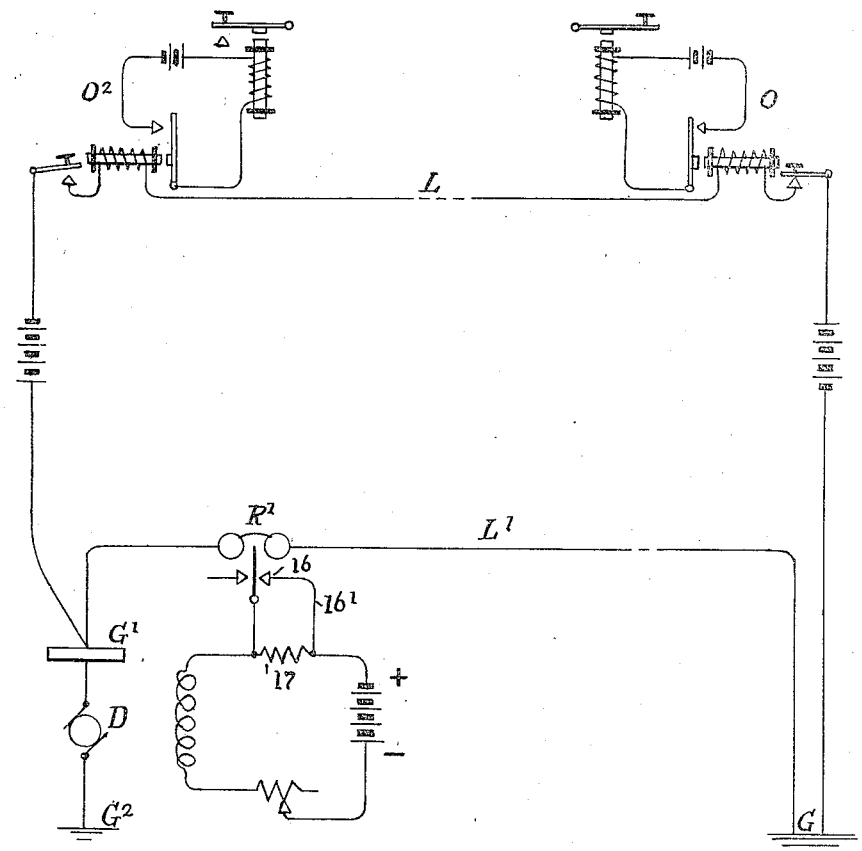

In the accompanying drawings, Figure 1 shows diagrammatically one arrangement of instrumentalities by which my invention may be carried out; and Fig. 2 is a similar representation of a more simple system.

Similar characters of reference apply to like parts throughout the various figures of the drawings.

The letters O O$^2$ designate telegraph stations between which there are shown as extending a single transmission line L and a duplex line L$^2$, the latter including the artificial lines $l$, $l^2$. All the circuits connecting these stations may be supplied with current from batteries B, B$^2$, or other sources of electrical energy. The batteries and the artificial lines are provided at the stations with grounds G and G$^2$, and it may be assumed that these are subjected to ground potentials of such a fluctuating character that G may sometimes be positive with respect to G$^2$ and sometimes negative. These grounds are joined by an equalizing conductor L' which is independent of the telegraph lines, and with said conductor at the station O$^2$ is associated a source of variable potential and a controlling means therefor. The former preferably consists of a generator D having an armature 10, which may be in series with the conductor L', and a field winding 11. For the controlling means I prefer a polar relay R, the winding of which is in the conductor L', while its tongue is united to one terminal of the field winding of the generator. The fixed contacts 12 and 13 of the relay R are connected through preferably adjustable resistances 14, 14 to oppositely poled batteries B' and B$^3$, the other sides of which are joined to the second terminal of the field winding. A high resistance 15 may be placed in parallel with the field winding to reduce sparking at the relay contacts. At the station O$^2$ a special grounding point or connection is shown at G' on the opposite side of the generator armature from the regular grounding point G$^2$. The station O is also shown as provided with a ground connection in the conductor L'. This may, however, be at any convenient point which is at substantially the same potential as G.

In using the herein described organization for carrying out my method, the resistances 14, 14 are so proportioned or adjusted and the generator terminals and relay contacts so connected that when the current in the conductor L', due to the diverse ground potentials at G and G$^2$, flows in one direction, as from G to G$^2$, the consequent movement of the relay tongue against one contact, as 12, puts the battery B' in circuit with the field winding 11 increasing the generator voltage so that the potential at G' is increased with relation to G$^2$. If, on the other hand, the ground current through conductor L' flows in the opposite direction, the relay tongue is moved against contact 13, battery B$^3$ is applied to the field winding and the generator voltage altered to decrease the potential at G' with respect to G$^2$. Equalizing impulses of the proper sign are thus rapidly applied by the generator to the ground conductor, so that the potential at G and G' is at all times approximately the same and the current through the relay winding is maintained close to zero. It will be understood that whether the fluctuations of ground potential are positive or negative, the opposing voltage of the generator must be at least as great.

A more simple application of the same principle is disclosed in Fig. 2 of the drawings. Here stations O and O$^2$ connected by the signaling line L are subjected to such ground potentials that when they are not equal O is positive with respect to O$^2$. In this case relay R' in conductor L' has but one active fixed contact 16, controlling with the relay tongue a short circuit 16' about a resistance 17 in series with the field winding of the generator D and its source of energy. Now when the ground potential at G rises above that at $G^2$, the making of contact 16 short circuits the resistance 17, increasing the voltage generator so that the potential at G' is increased with relation to that at $G^2$. Except as described, the adjustment and operation of this arrangement differs from that previously disclosed only in ways which will be obvious.

Having thus described my invention, I claim:—

1. The method of equalizing the potentials of grounding points at separated stations which consists in connecting such stations conductively to ground, and applying to the conductive connection at one station potentials tending to neutralize the differences in ground potential between it and the other station.

2. The method of equalizing the varying potentials of grounding points at separated stations which consists in connecting conductively grounds at such stations, and applying to the conductive connection at one station potentials opposite in sign and varying as the differences in ground potential.

3. The method of equalizing the potentials of grounding points at separated stations which consists in establishing a conductive connection to ground between such stations, applying to said conductive connection at one station an equalizing potential with respect to the ground potential at the other station, and controlling said equalizing potential by the current flow due to the difference in potentials between the grounding points.

4. The method of neutralizing potential differences between the grounding points of signaling lines which consists in providing a conductive connection between the points independent of the signaling lines, and applying to said conductive connection a neutralizing potential as great as the maximum difference of potential between the grounding points.

5. A ground connection for signaling systems comprising a conductor joining separated stations of a system, a source of electrical energy included in the conductor, and automatic means associated with the conductor for controlling the potential of said source.

6. A ground connection for signaling systems comprising a conductor joining separated stations of a system, an electric generator having an armature and field winding, the armature being included in said conductor, a source of electrical energy in circuit with the field winding, and means associated with a conductor for varying the current delivered to the field winding.

7. A ground connection for signaling systems comprising a conductor joining separated stations of a system, an electrical generator having an armature and field winding, the armature being included in said conductor, sources of electrical energy of opposite polarity, and means associated with the conductor for joining either source to the field winding.

8. The combination with telegraph stations and a telegraph line uniting the same, of a ground connection for the line at each station, and means independent of the telegraph line for equalizing differences of ground potential between the ground connections.

9. The combination with telegraph stations and a telegraph line uniting the same, of a conductor grounded at each station and furnishing the ground connection for the telegraph line at one station, an electric generator situated at one of the stations and having an armature and field winding, the armature being included in the conductor, a relay having its winding in the conductor, and a source of electrical energy in circuit with the contacts of the relay and field winding of the generator.

10. The combination with telegraph stations and a grounded telegraph line uniting the same, of a conductor grounded at each station and furnishing the ground connection for the telegraph lines at one station, an electric generator situated at one of the stations and having an armature and field winding, the armature being included in the conductor, a polar relay having its winding in the conductor, and sources of electrical energy of opposite polarity either of which may be joined to the field winding of the generator through the contacts of the polar relay.

11. The combination with signaling stations and a line uniting the same, of a conductor joining the stations and to which the signaling line is connected at each station, a source of electrical energy included in the conductor, and automatic means associated with the conductor for controlling the potential of said source.

In testimony whereof, I have signed my name to this specification in the presence of two subscribing witnesses, this 23rd day of October, 1913.

ALVA B. CLARK.

Witnesses:
CHAS. A. ROBINSON,
RAY S. HOYT.